US009330590B2

(12) United States Patent
Ota

(10) Patent No.: US 9,330,590 B2
(45) Date of Patent: May 3, 2016

(54) IMAGE DISPLAY APPARATUS AND METHOD FOR CONTROLLING IMAGE DISPLAY APPARATUS

(71) Applicant: SEIKO EPSON CORPORATION, Tokyo (JP)

(72) Inventor: Katsuya Ota, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/602,744

(22) Filed: Jan. 22, 2015

(65) Prior Publication Data

US 2015/0213575 A1 Jul. 30, 2015

(30) Foreign Application Priority Data

Jan. 30, 2014 (JP) ................................ 2014-015230

(51) Int. Cl.
*G06T 1/60* (2006.01)
*G09G 3/20* (2006.01)
*G09G 3/36* (2006.01)

(52) U.S. Cl.
CPC ................ *G09G 3/2003* (2013.01); *G09G 3/36* (2013.01); *G09G 2330/06* (2013.01)

(58) Field of Classification Search
None
See application file for complete search history.

(56) References Cited

U.S. PATENT DOCUMENTS 5,592,236 A * 1/1997 Rosenbaum ............. H04N 9/76 345/589
6,023,302 A * 2/2000 MacInnis ................ H04N 9/75 348/586
6,414,678 B1 * 7/2002 Goddard ................. G06T 15/00 345/419
6,831,617 B1 * 12/2004 Miyauchi ............. G09G 3/3666 345/1.3
6,943,834 B1 * 9/2005 Hirai .................. H04N 1/00291 348/222.1
7,315,652 B2 * 1/2008 Takahashi ............. H04N 19/63 375/240.19
8,243,308 B2 * 8/2012 Komatsu ............ H04N 1/00204 358/1.15
2006/0214819 A1 * 9/2006 Deoka .................. H04N 1/4175 341/50
2009/0245631 A1 * 10/2009 Isomura ................ H04N 19/50 382/166
2012/0044003 A1 * 2/2012 Itou ....................... H03L 7/0805 327/160

FOREIGN PATENT DOCUMENTS

JP 2012-044488 A 3/2012
JP 2014-134704 A 7/2014

* cited by examiner

*Primary Examiner* — Ashish K Thomas
(74) *Attorney, Agent, or Firm* — Oliff PLC

(57) ABSTRACT

In an image display apparatus, a processor loads background image data into a frame memory via a data bus in a unit of a predetermined number of bits. When the color information for each pixel is divided into n parts to form divided data in a unit of the predetermined number of bits, the number of standing bits is calculated for each of the parts of the divided data, differences in the number of standing bits between the n parts of the divided data are calculated, and the sum of the differences in the number of standing bits is calculated as a difference sum, the background image data has a difference sum that falls within a lower 50% of the difference sums arranged in descending order for the color information that satisfies a condition that a brightness grayscale level is 90% or greater.

8 Claims, 6 Drawing Sheets

DATA FOR DIFFERENT GRAYSCALE LEVELS

T1

| GRAYSCALE LEVEL | Y | U | V | DIFFERENCE SUM (8bit) | RADIATION NOISE (dB) |
|---|---|---|---|---|---|
| 255 | 049 | 3FE | 1D1 | 14 | 36.3 |
| 254 | 049 | 3FC | 1D2 | 16 | 36.3 |
| 253 | 049 | 3FA | 1D2 | 12 | 33.9 |
| 252 | 049 | 3F8 | 1D2 | 14 | 34.8 |
| 251 | 048 | 3F6 | 1D2 | 14 | 35.4 |
| 250 | 048 | 3F4 | 1D2 | 16 | 36.2 |
| 249 | 048 | 3F2 | 1D3 | 10 | 32.0 |
| 248 | 047 | 3F0 | 1D3 | 8 | 29.6 |
| 247 | 047 | 3EE | 1D3 | 10 | 31.4 |
| 246 | 047 | 3EC | 1D3 | 10 | 32.7 |
| 245 | 047 | 3EA | 1D3 | 8 | 28.9 |
| 244 | 046 | 3E8 | 1D3 | 10 | 31.5 |
| 243 | 046 | 3E6 | 1D4 | 14 | 35.7 |
| 242 | 046 | 3E4 | 1D4 | 16 | 36.5 |
| 241 | 045 | 3E2 | 1D4 | 12 | 33.5 |
| 240 | 045 | 3E0 | 1D4 | 14 | 34.5 |
| 239 | 045 | 3DE | 1D4 | 16 | 37.0 |
| 238 | 045 | 3DC | 1D5 | 16 | 36.7 |
| 237 | 044 | 3DA | 1D5 | 14 | 35.3 |
| 236 | 044 | 3D8 | 1D5 | 16 | 35.9 |
| 235 | 044 | 3D6 | 1D5 | 14 | 35.3 |
| 234 | 043 | 3D4 | 1D5 | 14 | 36.3 |
| 233 | 043 | 3D2 | 1D5 | 10 | 33.3 |
| 232 | 043 | 3D0 | 1D6 | 12 | 33.6 |
| 231 | 043 | 3CE | 1D6 | 12 | 34.8 |
| 230 | 042 | 3CC | 1D6 | 16 | 37.1 |
| 229 | 042 | 3CA | 1D6 | 12 | 34.3 |
| 228 | 042 | 3C8 | 1D6 | 14 | 35.2 |
| 227 | 041 | 3C6 | 1D7 | 10 | 33.1 |
| 226 | 041 | 3C4 | 1D7 | 12 | 34.1 |
| 225 | 041 | 3C2 | 1D7 | 8 | 30.4 |
| 224 | 041 | 3C0 | 1D7 | 10 | 31.7 |
| 223 | 040 | 3BE | 1D7 | 16 | 37.5 |
| 222 | 040 | 3BC | 1D7 | 18 | 38.3 |
| 221 | 040 | 3BA | 1D8 | 18 | 38.1 |
| 220 | 03F | 3B8 | 1D8 | 10 | 32.1 |
| 219 | 03F | 3B6 | 1D8 | 8 | 31.6 |
| 218 | 03F | 3B4 | 1D8 | 10 | 32.7 |

FIG. 4

REARRANGED DATA

T2

| GRAYSCALE LEVEL | Y | U | V | DIFFERENCE SUM (8bit) | RADIATION NOISE (dB) | REMARKS |
|---|---|---|---|---|---|---|
| 222 | 040 | 3BC | 1D7 | 18 | 38.3 | |
| 221 | 040 | 3BA | 1D8 | 18 | 38.1 | |
| 223 | 040 | 3BE | 1D7 | 16 | 37.5 | |
| 230 | 042 | 3CC | 1D6 | 16 | 37.1 | |
| 239 | 045 | 3DE | 1D4 | 16 | 37.0 | |
| 238 | 045 | 3DC | 1D5 | 16 | 36.7 | |
| 242 | 046 | 3E4 | 1D4 | 16 | 36.5 | |
| 254 | 049 | 3FC | 1D2 | 16 | 36.3 | |
| 234 | 043 | 3D4 | 1D5 | 14 | 36.3 | |
| 255 | 049 | 3FE | 1D1 | 14 | 36.3 | DEFAULT DATA |
| 250 | 048 | 3F4 | 1D2 | 16 | 36.2 | |
| 236 | 044 | 3D8 | 1D5 | 16 | 35.9 | |
| 243 | 046 | 3E6 | 1D4 | 14 | 35.7 | |
| 251 | 048 | 3F6 | 1D2 | 14 | 35.4 | |
| 235 | 044 | 3D6 | 1D5 | 14 | 35.3 | |
| 237 | 044 | 3DA | 1D5 | 14 | 35.3 | |
| 228 | 042 | 3C8 | 1D6 | 14 | 35.2 | |
| 252 | 049 | 3F8 | 1D2 | 14 | 34.8 | |
| 231 | 043 | 3CE | 1D6 | 12 | 34.8 | |
| 240 | 045 | 3E0 | 1D4 | 14 | 34.5 | |
| 229 | 042 | 3CA | 1D6 | 12 | 34.3 | |
| 226 | 041 | 3C4 | 1D7 | 12 | 34.1 | |
| 253 | 049 | 3FA | 1D2 | 12 | 33.9 | |
| 232 | 043 | 3D0 | 1D6 | 12 | 33.6 | |
| 241 | 045 | 3E2 | 1D4 | 12 | 33.5 | |
| 233 | 043 | 3D2 | 1D5 | 10 | 33.3 | |
| 227 | 041 | 3C6 | 1D7 | 10 | 33.1 | |
| 218 | 03F | 3B4 | 1D8 | 10 | 32.7 | |
| 246 | 047 | 3EC | 1D3 | 10 | 32.7 | |
| 220 | 03F | 3B8 | 1D8 | 10 | 32.1 | |
| 249 | 048 | 3F2 | 1D3 | 10 | 32.0 | |
| 224 | 041 | 3C0 | 1D7 | 10 | 31.7 | |
| 219 | 03F | 3B6 | 1D8 | 8 | 31.6 | |
| 244 | 046 | 3E8 | 1D3 | 10 | 31.5 | |
| 247 | 047 | 3EE | 1D3 | 10 | 31.4 | |
| 225 | 041 | 3C2 | 1D7 | 8 | 30.4 | |
| 248 | 047 | 3F0 | 1D3 | 8 | 29.6 | OPTIMUM BLUE DATA |
| 245 | 047 | 3EA | 1D3 | 8 | 28.9 | |

FIG. 5

COLOR PALETTE

P1

| INPUT | WHITE | YELLOW | CYAN | GREEN | MAGENTA | RED | BLUE | BLACK |
|---|---|---|---|---|---|---|---|---|
| R | 255 | 255 | 0 | 0 | 255 | 255 | 0 | 0 |
| G | 255 | 255 | 255 | 255 | 0 | 0 | 0 | 0 |
| B | 255 | 0 | 255 | 0 | 255 | 0 | 255 | 0 |

FIG. 6A

COLOR PALETTE

P2

| INPUT | WHITE | YELLOW | CYAN | GREEN | MAGENTA | RED | BLUE | BLACK |
|---|---|---|---|---|---|---|---|---|
| R | 240 | 240 | 0 | 0 | 240 | 240 | 0 | 0 |
| G | 240 | 240 | 240 | 240 | 0 | 0 | 0 | 0 |
| B | 240 | 0 | 240 | 0 | 240 | 0 | 240 | 0 |

FIG. 6B

IMAGE DISPLAY APPARATUS AND METHOD FOR CONTROLLING IMAGE DISPLAY APPARATUS

BACKGROUND

1. Technical Field

The present invention relates to an image display apparatus and a method for controlling the image display apparatus.

2. Related Art

In a data processing system having a multiple-bit data bus, it has been known that simultaneous switching noise is produced. The simultaneous switching noise is produced when signals in a plurality of signal lines simultaneously change, causing EMI (ElectroMagnetic Interference) to worsen. In recent years, sophistication of data processing causes an increase in both signal speed and the number of bits in a data bus in a circuit substrate, making it difficult to take measures against the simultaneous switching noise. A method for reducing the simultaneous switching noise by delaying a signal in each signal line in a data bus for skew adjustment has therefore been proposed (see JP-A-2012-044488, for example).

The configuration described in JP-A-2012-044488 includes a buffer circuit and a delay circuit in correspondence with each signal line in a data bus, and the amount of delay provided by the delay circuit is determined based on a change in the signal in the signal line. Since the configuration described above has a complicated circuit configuration, a method for reducing the simultaneous switching noise in a simpler configuration has been desired. In an image data processing apparatus, in particular, a large amount of image data needs to be processed at high speed. In this case, complicated processing for reduction in simultaneous switching noise undesirably tends to cause a problem of delay in processing and other problems.

SUMMARY

An advantage of some aspects of the invention is to provide a simple configuration that reduces simultaneous switching noise produced in image data processing.

The invention can be implemented a the following forms or application examples.

APPLICATION EXAMPLE 1

This application example is directed to an image display apparatus including a processor, a frame memory into which image data is loaded, a data bus that electrically connects the processor and the frame memory to each other, and a display unit that displays an image based on the image data. The processor loads background image data stored as the image data configured in a predetermined color information format into the frame memory via the data bus in a unit of a predetermined number of bits. The display unit displays a background image based on the background image data loaded into the frame memory. When the color information for each pixel is divided into n parts (n is an integer greater than or equal to 1) to form divided data in a unit of the predetermined number of bits, the number of standing bits which is the number of bits having a value of 1 is calculated for each of the parts of the divided data, differences in the number of standing bits between the n parts of the divided data are calculated, and the sum of the differences in the number of standing bits is calculated as a difference sum, the background image data is image data having a difference sum that falls within a lower 50% of the difference sums arranged in descending order for the color information that satisfies a condition that a brightness grayscale level is 90% or greater.

The image display apparatus described above includes a processor, a frame memory, a data bus that connects the processor and the frame memory to each other, and a display unit. The processor loads (writes and reads) image data configured in a predetermined color information format into the frame memory via the data bus in a unit of a predetermined number of bits. The display unit displays a background image based on background image data that is the image data loaded into the frame memory and has a predetermined background color. For color information that satisfies a condition that a brightness grayscale level is 90% or greater, the background image data is image data having a difference sum that falls within the lower 50% of the difference sums arranged in descending order. The difference sum is defined as follows: color information for each pixel in the background image data is divided into n parts for form divided data in a unit of the predetermined number of bits to generate divided data, the number of standing bits, which is the number of bits having a value of 1, is calculated for each of the parts of the divided data, and the sum of the differences in the number of standing bits between the parts of the divided data is defined as the difference sum. When the thus determined background image is displayed, the switching noise can be reduced. Specifically, the smaller the difference sum, that is, the smaller a change in the number of standing bits having a value of 1, the smaller the magnitude of the switching noise in the image display apparatus.

APPLICATION EXAMPLE 2

This application example is directed to the image display apparatus according to the application example described above, wherein the predetermined number of bits is determined by a storage bit unit of the frame memory.

According to the image display apparatus described above, since the predetermined number of bits is determined by the storage bit unit of the frame memory, the background image data can be readily loaded into the frame memory.

APPLICATION EXAMPLE 3

This application example is directed to the image display apparatus according to the application example described above, wherein among a set of the background image data each of which has the difference sum having a minimum value, the display unit displays the background image using background image data having a maximum brightness.

According to the image display apparatus described above, among a set of the background image data each of which has the difference sum having a minimum value, the display unit displays the background image using background image data having a maximum brightness. As a result, a bright background image can be displayed with the switching noise reduced.

APPLICATION EXAMPLE 4

This application example is directed to the image display apparatus according to the application example described above, wherein the predetermined color information format is a YUV format, and the display unit displays the background image using the background image data having the difference sum of 10 or smaller.

According to the image display apparatus described above, the switching noise can be reduced.

APPLICATION EXAMPLE 5

This application example is directed to the image display apparatus according to the application example described above, wherein the predetermined color information format is an RGB format, the background image data is generated based on a predetermined color palette, and the display unit displays the background image using the generated background image data.

According to the image display apparatus described above, when the background image data is generated based on a predetermined color palette that provides a small number of standing bits, the switching noise can be reduced.

APPLICATION EXAMPLE 6

This application example is directed to the image display apparatus according to the application example described above, wherein the background image is a standby image displayed when no image signal is inputted to the image display apparatus.

According to the image display apparatus described above, the switching noise in a standby image can be reduced.

APPLICATION EXAMPLE 7

This application example is directed to the image display apparatus according to the application example described above, wherein the background image is a background image in OSD display.

According to the image display apparatus described above, the switching noise in OSD display can be reduced.

APPLICATION EXAMPLE 8

This application example is directed to a method for controlling an image display apparatus including a processor, a frame memory into which image data is loaded, a data bus that electrically connects the processor and the frame memory to each other, and a display unit that displays an image based on the image data, the method including allowing the processor to load background image data stored as the image data configured in a predetermined color information format into the frame memory via the data bus in a unit of a predetermined number of bits; and allowing the display unit to display a background image based on the background image data loaded into the frame memory. When the color information for each pixel is divided into n parts (n is an integer greater than or equal to 1) to form divided data in a unit of the predetermined number of bits, the number of standing bits, which is the number of bits having a value of 1, is calculated for each of the parts of the divided data, differences in the number of standing bits between the n parts of the divided data are calculated, and the sum of the differences in the number of standing bits is calculated as a difference sum, the background image data is image data having a difference sum that falls within a lower 50% of the difference sums arranged in descending order for the color information that satisfies a condition that a brightness grayscale level is 90% or greater.

In the method for controlling an image display apparatus described above, when the thus determined background image is displayed, the switching noise can be reduced. Specifically, the smaller the difference sum, that is, the smaller a change in the number of standing bits having a value of 1, the smaller the magnitude of the switching noise in the image display apparatus.

When the image display apparatus and the method for controlling the image display apparatus described above are achieved by using a computer provided in the image display apparatus, the forms and the application examples described above can be provided in an aspect of a program that achieves the functions of the image display apparatus and the method for controlling the image display apparatus or in an aspect of a recording medium or any other medium on which the program is recorded in a computer readable manner. Examples of the recording medium may include a flexible disk, an HDD (Hard Disk Drive), a CD-ROM (Compact Disk Read Only Memory), a DVD (Digital Versatile Disk), a Blu-ray (registered trademark) disc, a magneto-optical disk, a nonvolatile memory card, an internal storage device in the image display apparatus (RAM (Random Access Memory), ROM (Read Only Memory), or any other semiconductor memory), an external storage device (such as USB (Universal Serial Bus) memory), and a variety of other media that can be read by the computer.

BRIEF DESCRIPTION OF THE DRAWINGS

The invention will be described with reference to the accompanying drawings, wherein like numbers reference like elements.

FIG. 3A describes the change in a case where the brightness grayscale level is 255/255, and FIG. 3B describes the change in a case where the brightness grayscale level is 248/255.

FIG. 4 shows experimental data for different brightness grayscale levels of the blue data.

FIG. 5 shows the experimental results rearranged in the descending order of the magnitude of radiation noise.

FIGS. 6A and 6B show color palettes in a projector according to a second embodiment. FIG. 6A shows a typical color palette, and FIG. 6B shows a color palette for a standby image and OSD display.

DESCRIPTION OF EXEMPLARY EMBODIMENTS

First Embodiment

As a first embodiment of an image display apparatus, a projector that loads image data in a YUV format into a frame memory will be described below with reference to the drawings.

Figure 1:
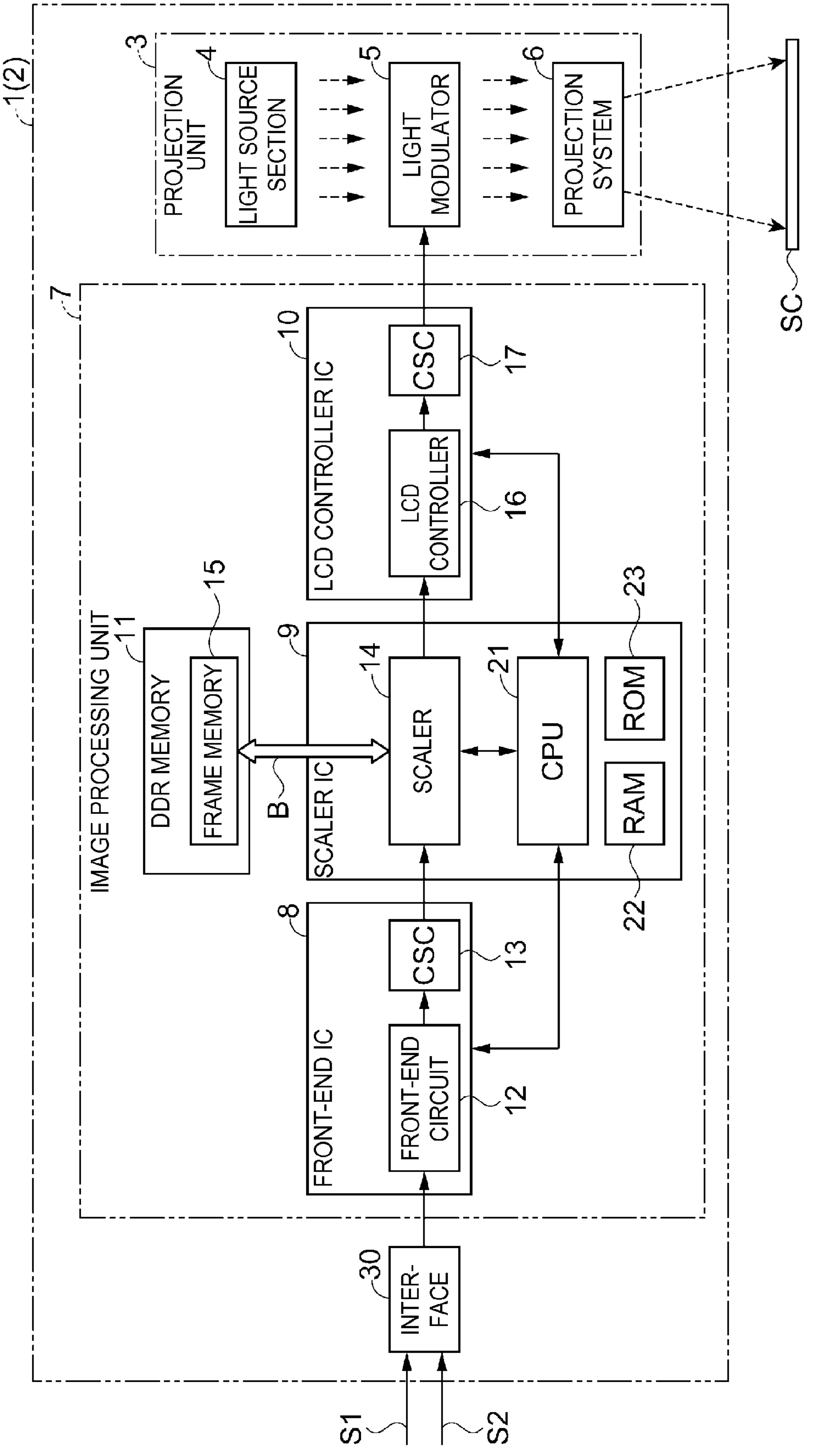
FIG. 1 is a functional block diagram showing a schematic configuration of a projector according to a first embodiment.

FIG. 1 is a functional block diagram showing a schematic configuration of the projector according to the first embodiment.

A projector 1 projects an image on a screen SC. The projector 1 includes an interface 30, a projection unit 3 (display unit), and an image processing unit 7. The projector 1 further includes an operation panel operated by a user, a remote control, a remote control receiver that communicates with the remote control, a power supply, and other components, but none of them will be illustrated nor described below.

The interface 30 includes a connector connected to an external image supply apparatus (not shown), an interface circuit, and other components (none of them is shown). For example, the interface 30 may include DVI, USB, LAN, HDMI (registered trademark), DisplayPort (trademark), or any of other variety of interfaces as an interface for digital data. The interface 30 may further include an S-video terminal, an RCA terminal, a D terminal, a D-Sub terminal, or any other terminal as an interface for an analog image signal. The apparatus connected to the interface 30 may be a personal computer, a video reproduction apparatus, a DVD reproduction apparatus, a TV tuner, a CATV set top box, a video game console, or any other video output apparatus. The interface 30 in the present embodiment receives digital image data S1 and an analog image signal S2 as inputs. The interface 30 outputs the inputted digital image data S1 and analog image signal S2 to the image processing unit 7.

The projection unit 3 includes alight source section 4, a light modulator 5, and a projection system 6. The light source section 4 includes a xenon lamp, an ultrahigh-pressure mercury lamp, or any other lamp as a light source. The light source section 4 may further include a reflector and an auxiliary reflector (neither of them is shown) that guide light emitted from the light source to the light modulator 5. The light source section 4 may further include a group of lenses for enhancing optical characteristics of projected light, a polarizer, a light attenuator that is provided in a position on the path to the light modulator 5 and reduces the amount of light emitted from the light source (none of them is shown).

The light modulator 5 modulates the light outputted from the light source section 4 based on image data inputted from the image processing unit 7. The light modulator 5 in the present embodiment includes three transmissive liquid crystal panels (not shown) corresponding to RGB colors. The light modulator 5 forms an image by pixels arranged in each of the transmissive liquid crystal panels and modulates the light outputted from the light source section 4. The liquid crystal panels in the light modulator 5 are driven by a liquid crystal driver IC (Integrated Circuit), although not shown, for the image formation. The light modulator 5 may instead be configured by using reflective liquid crystal light valves or three digital mirror devices (DMDs). The light modulator 5 may still instead be configured by using a combination of a color wheel and a single DMD or liquid crystal panel.

The projection system 6 includes a group of lenses that perform enlargement and reduction of a projected image and focus adjustment, a zoom adjustment motor, a focus adjustment motor, and other components (none of them is shown). The projection system 6 projects the modulated light (image light) from the light modulator 5 on the screen SC to form an image on the screen SC.

The image processing unit 7 processes the digital image data S1 or the analog image signal S2 inputted through the interface 30 and outputs the processed data or signal to the projection unit 3. The image processing unit 7 includes a front-end IC 8, a scaler IC 9, an LCD controller IC 10, and a DDR memory 11. The DDR memory 11 is a memory device that complies with the DDR SDRAM (Double-Data-Rate Synchronous Dynamic Random Access Memory) standard. A frame memory 15 forms a storage area of the DDR memory 11.

The front-end IC 8 includes a front-end circuit 12 and a color space converter (CSC) 13. The front-end circuit 12 is disposed in an input stage of the front-end IC 8 and receives the digital image data S1 and the analog image signal S2 as inputs through the interface 30. The front-end circuit 12 decodes the digital image data S1 inputted through the interface 30 and outputs the decoded data to the color space converter 13. The front-end circuit 12 further performs A/D conversion on the analog image signal S2 inputted through the interface 30 and outputs the converted digital image data to the color space converter 13.

The color space converter 13 is formed of hardware capable, for example, of 3×3 matrix operation and disposed in an output stage of the front-end IC 8. The color space converter 13 performs color space conversion (luminance chrominance space (YUV)-RGB space) on the digital image data inputted from the front-end circuit 12 and outputs the processed data to the scaler IC 9. In the present embodiment, the image data is outputted to the scaler IC 9 in the form of an RGB-formatted data formed of a 10-bit R component, a 10-bit G component, and a 10-bit B component.

The scaler IC 9 has a color space converter that is not shown but converts the RGB-formatted image data inputted from the front-end IC 8 into YUV-formatted image data. The scaler IC 9 includes a scaler 14, which processes inputted data under the control of a CPU 21. The scaler 14 loads the inputted data into the frame memory 15 to draw an image corresponding to one frame. The scaler 14 corresponds to a processor.

The scaler 14 and the frame memory 15 are connected to each other via a bus B. The bus B has a data bus having a bus width or a bit width according to the number of bits of image data to be stored in the frame memory 15. In the present embodiment, the frame memory 15 stores image data on an 8-bit basis. The data bus of the bus B therefore has an 8-bit bus width.

The scaler IC 9, specifically, the color space converter that is not shown converts data formed of a 10-bit R component, a 10-bit G component, and a 10-bit B component into YUV-formatted data, as described above. The converted data is formed of a 10-bit Y component, a 10-bit U component, and a 10-bit V component. The scaler 14 stores (loads) the YUV-formatted data in the frame memory 15 on an 8-bit basis. Therefore, to write the 10-bit data to the frame memory 15, the data needs to be converted into 8-bit data.

Figure 2:
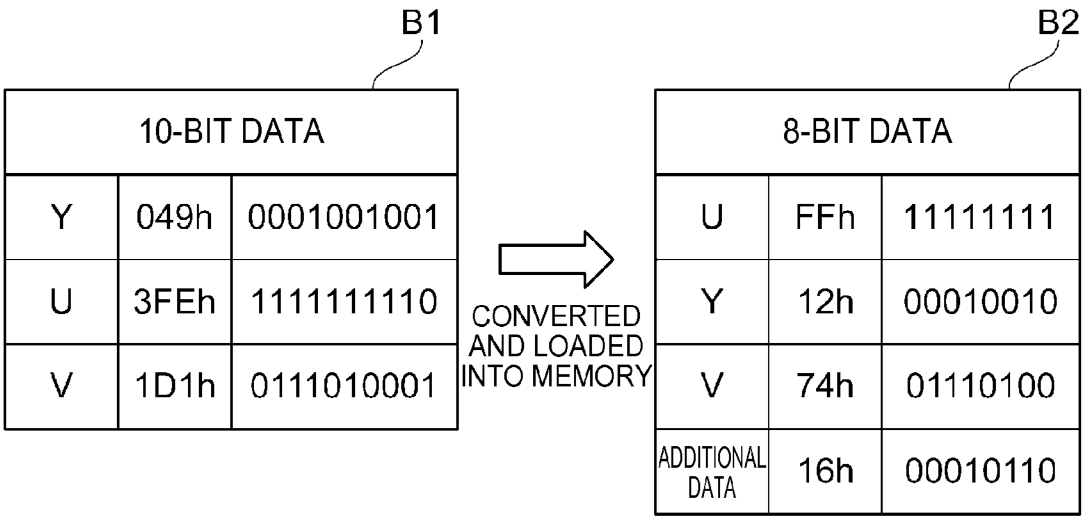
FIG. 2 describes a process of converting 10-bit data into 8-bit data.

FIG. 2 describes a process of converting 10-bit data into 8-bit data.

FIG. 2 shows data on a blue image (hereinafter also referred to as "blue data") that is a standby image displayed when no image signal is inputted to the projector 1. The scaler 14 converts 10-bit data B1 formed of a Y component of 049h, a U component of 3FEh, and a V component of 1D1*h* into 8-bit data B2 formed of a U component of FFh, a Y component of 12h, a V component of 74h, and an additional data of 16h, as shown in FIG. 2, and writes (loads) the converted data to the frame memory 15 via the bus B. Specifically, the higher-order 8 bits of each of the components of the 10-bit data B1 are first extracted and set as the value of the corresponding one of Y, U, and V components of the 8-bit data B2. The order of Y, U, and V is then changed to U, Y, and V. Further, the additional data (8 bits) is generated by arranging the lower-order 2 bits of the components of the 10-bit data B1 in the order of U, Y, and V in an ascending manner and adding "00" as the highest-order 2 bits. The 10-bit data formed of the Y, U, and V components can thus be converted into the 8-bit data formed of the U, Y, and V components and the additional data. The scaler 14 can then write (load) and read the data to and from the frame memory 15 on an 8-bit basis via the bus B having an 8-bit bus width. The 8-bit data formed of the U, Y, and V components and the 8-bit additional data correspond to divided data.

The switching noise (simultaneous switching noise) will now be described. When the scaler 14 accesses the frame memory 15, the bus B produces the switching noise, as described above. Specifically, the greater a change (variation) in the number of bits having a value "1" (number of standing bits) on the data bus, the greater the magnitude of the switching noise. The reason for this is that the greater a time-series change in the number of standing bits, the greater the variation in the load acting on the power supply (not shown) (the greater a change in power from the power supply). That is, the greater a change in current to be used, the greater the magnitude of switching noise produced from the power supply. The thus produced switching noise causes a large magnitude of radiation noise (RAD noise) to be emitted from the projector 1.

Consider now the change in the number of standing bits in the data bus (8-bit width) of the bus B.

Figure 3A:
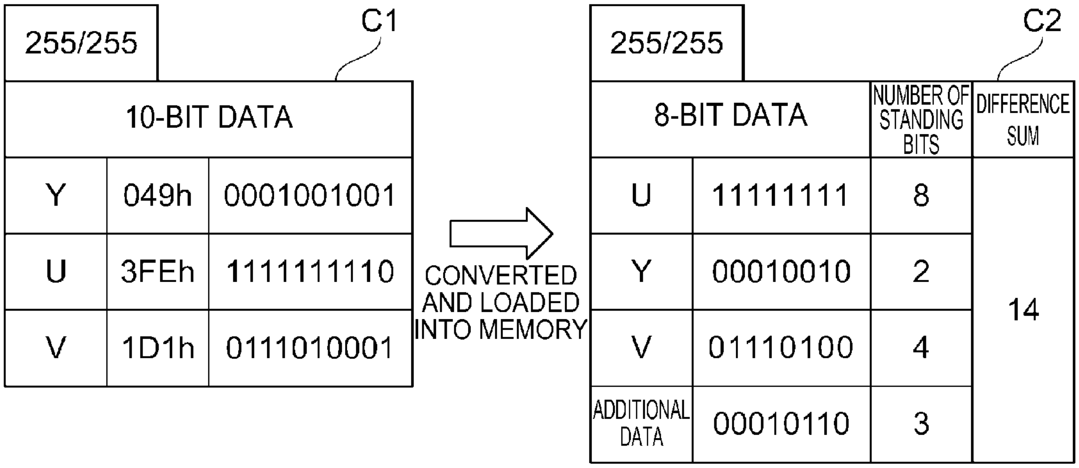
FIGS. 3A and 3B describe a change in the number of standing bits in blue data.
Figure 3B:
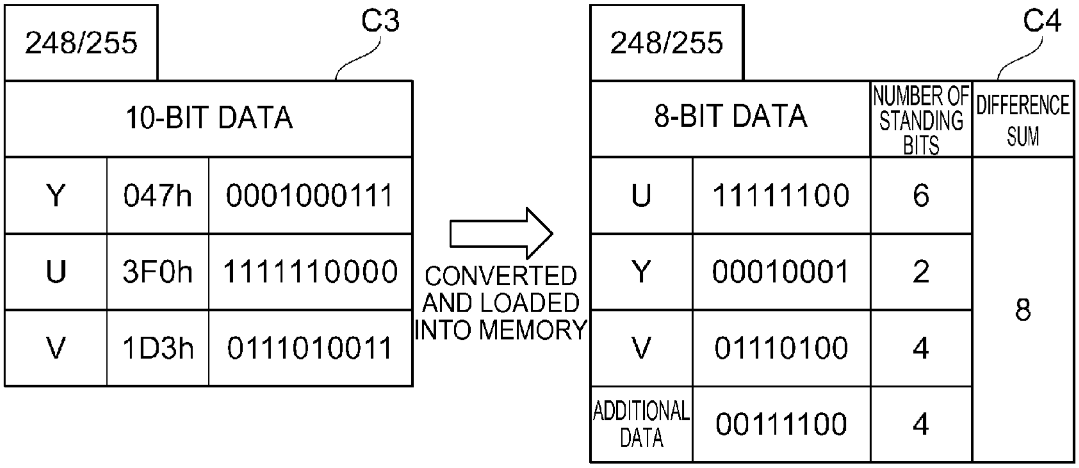

FIGS. 3A and 3B describe the change in the number of standing bits in the blue data. FIG. 3A describes the change in a case where the brightness grayscale level is 255/255, and FIG. 3B describes the change in a case where the brightness grayscale level is 248/255.

When the brightness grayscale level of the blue data is 255/255, and 10-bit data C1 is converted into 8-bit data C2, the 8-bit data C2 is formed of a U component of FFh, a Y component of 12h, a V component of 74h, and additional data of 16h, as shown in FIG. 3A. The number of standing bits is 8 in the U component, 2 in the Y component, 4 in the V component, and 3 in the additional data. The difference in the number of standing bits between U and Y, each of which is a time-series change in the standing bit, is 6. The difference between Y and V is 2, the difference between V and the additional data is 1, and the difference between the additional data and U is 5. The sum of the differences or a difference sum is 14.

On the other hand, when the brightness grayscale level of the blue data is 248/255, and 10-bit data C3 is converted into 8-bit data C4, the 8-bit data C4 is formed of a U component of FCh, a Y component of 11h, a V component of 74h, and additional data of 3Ch. The number of standing bits is 6 in the U component, 2 in the Y component, 4 in the V component, and 4 in the additional data. The difference in the number of standing bits between U and Y, each of which is a time-series change in the standing bit, is 4. The difference between Y and V is 2, the difference between V and the additional data is 0, and the difference between the additional data and U is 2. The sum of the differences or the difference sum is 8.

The difference sum and the magnitude of radiation noise corresponding thereto were experimentally measured with the brightness grayscale level of the blue data changed (from 255 to 218). Results of the experiment will be described.

FIG. 4 shows experimental data for different brightness grayscale levels of the blue data.

As shown in FIG. 4, at the highest brightness grayscale level of 255/255, the difference sum (8 bits) is 14 and the radiation noise corresponding thereto is 36.3 dB. On the other hand, at the brightness grayscale level of 248/255, the difference sum (8 bits) is 8 and the radiation noise corresponding thereto is 29.6 dB.

Further, the experimental results shown in FIG. 4 will be examined by using a table (figure) in which the experimental results are rearranged in descending order of the magnitude of radiation noise.

FIG. 5 shows the experimental results rearranged in the descending order of the magnitude of radiation noise.

Evaluation of the experimental data in FIG. 5 shows that in the blue data, the brightness grayscale level of 255/255 provides a large difference sum and a large magnitude of radiation noise. The evaluation of the experimental data in FIG. 5 further shows that the brightness grayscale level of 248/255 provides a small difference sum and a small magnitude of radiation noise. That is, based on the results shown in FIGS. 4 and 5, it can be said that the radiation noise is small and the brightness grayscale level is large at the brightness grayscale level of 248/255, which can be evaluated to be optimum as blue data. The blue data having the brightness grayscale level of 248/255 satisfies the following conditions.

(1) For color information in which the brightness grayscale level is 90% or greater, the difference sum at the brightness grayscale level of 248/255 falls within the lower 50% of the difference sums arranged in descending order.

(2) Among data in which the difference sum has a minimum of 8, the brightness grayscale level of 248/255 is the greatest.

(3) The format of the color information is YUV, and the difference sum is 10 or smaller.

In the projector 1 according to the present embodiment, the blue data having the brightness grayscale level of 248/255 is used to form a standby image. Further, when a color different from blue is used to forma standby image, color data that satisfies the condition (1), (2), or (3) described above is also used to form the standby image. Color data that satisfies the condition (1), (2), or (3) described above is also used to form a background image in OSD display. The decrease in the brightness grayscale level can be corrected by a color space converter 17 in the LCD controller IC 10. In this process, the color space converter 17 does not access the frame memory 15 and therefore does not affect the noise.

Referring back to FIG. 1, the scaler 14 performs a variety of types of image processing on an image loaded into the frame memory 15. As an example of the variety of types of image processing, resolution conversion is performed on the data inputted from the front-end IC 8.

The scaler 14 may further perform distortion correction on the image loaded into the frame memory 15 to correct trapezoidal distortion and pincushion distortion produced when the projection unit 3 projects an image on the screen SC. In the distortion correction, the scaler 14 deforms the image in the frame memory 15 in such a way that the distortion produced on the screen SC is canceled.

The scaler 14 may further adjust the color tone of the image loaded into the frame memory 15. The projector 1 has a color mode function of adjusting the color tone of an image projected on the screen SC. In the color mode function, a user selects a desired color mode, for example, from a theater mode, a living room mode, a blackboard mode, and other preset color modes. The scaler 14 uses an adjustment parameter corresponding to the specified color mode to change the colors of the image drawn in the frame memory 15.

Having performed the variety of image processing described above, the scaler 14 outputs the image data in the frame memory 15 to the LCD controller IC 10. The LCD controller IC 10 includes an LCD controller 16 and the color space converter (CSC) 17.

The LCD controller 16 is disposed in an input stage of the LCD controller IC 10. The LCD controller 16 performs a variety types of image adjustment including gamma adjustment on the image data inputted from the scaler IC 9. Having performed the image adjustment, the LCD controller 16 generates data on an image to be drawn on the liquid crystal panels provided in the light modulator 5 and outputs the image data to the color space converter 17. The LCD controller 16 also has a function of calculating an average picture level (APL) of a single-frame image and a function of measuring a frequency distoribution (histogram) of a single-frame image based on the image data inputted from the scaler 14.

The color space converter 17 is formed of hardware capable, for example, of 3×3 matrix operation and disposed in an output stage of the LCD controller IC 10. The color space converter 17 performs color space conversion on the image data processed by the LCD controller 16 and outputs the image data having undergone the color space conversion to the light modulator 5.

The scaler IC 9 further includes the CPU 21, a RAM 22, and a ROM 23. The CPU 21 reads a program stored in the ROM 23 and executes the program to control the components in the image processing unit 7 based on setting values and other data stored in the ROM 23. The ROM 23 further stores data on a standby image as a background image, image data for OSD display, and other data. The RAM 22 temporarily stores the program executed by the CPU 21, data to be processed, and other data.

The CPU 21 executes the program in the ROM 23 to control the scaler 14. The scaler 14 loads an image into the frame memory 15 and performs the variety of types of image processing (resolution conversion, distortion correction, and color tone adjustment) described above and other types of processing under the control of the CPU 21. The CPU 21 outputs data specifying a process to be carried out, a parameter associated with the specified process, and other data to the scaler 14. The parameter is stored, for example, in the ROM 23.

The first embodiment described above provides the following advantageous effects.

(1) The scaler 14 in the projector 1 loads image data configured in the YUV format into the frame memory 15 via the data bus on an 8-bit basis. The scaler 14 further reads the image data from the frame memory 15. Since each pixel in the image data in the projector 1 has YUV-formatted 10-bit data, the scaler IC 9 converts the 10-bit data into the four types of 8-bit data, Y, U, V, and additional data, and loads them into the frame memory 15.

When background image data that forms, for example, a standby image and a background image in OSD display, is handled, the number of standing bits is calculated in advance for each of the four types of data, and the differences in the number of standing bits between the four types of data are summed to calculate the difference sum. For color information that satisfies the condition that the brightness grayscale level is 90% or greater, image data having a difference sum that falls within the lower 50% of the difference sums arranged in descending order is stored as the background image data in the ROM 23. The projector 1 then displays a standby image or a background image in OSD display based on the background image data. In the present embodiment, image data that is blue data and has a brightness grayscale level of 248/255 and a difference sum of 8 forms a standby image.

Displaying the thus formed background image (background color) allows reduction in the switching noise and further allows reduction in the radiation noise. Specifically, the smaller the difference sum, that is, the smaller the time-series change (variation) in the number of standing bits having a value of 1, the smaller the magnitudes of the switching noise and the radiation noise in the projector 1. The EMI noise can therefore be suppressed.

(2) In the present embodiment, in the projector 1, among a set of background image data each of which is blue data and has a minimum difference sum of 8, background image data having the maximum brightness grayscale level of "248" forms a background image projected by the projector 1. As a result, a bright background image can be displayed with the switching noise and the radiation noise reduced.

(3) In the present embodiment, the projector 1 uses background image data having a difference sum of 8 as the blue data that forms a standby image. As shown in FIG. 5, when the difference sum is 10 or smaller, the magnitude of radiation noise is about 33 dB or lower, whereby it can be said that the noise level is acceptable and suitable for a standby image and a background image in OSD display.

(4) In the projector 1, since the magnitude of radiation noise can be reduced by using background image data having a small difference sum, a shield plate, an electromagnetic absorber, and other noise reducing parts can be omitted.

(5) The switching noise and the radiation noise can be reduced by setting the brightness grayscale level of background image data that forms, for example, a standby image and a background image in OSD display stored in advance in the ROM 23 in the projector 1 in such a way that the difference sum is small. The configuration described above is beneficial because no increase in hardware cost is required.

Second Embodiment

In a second embodiment, a projector that loads image data in an RGB format into a frame memory will be described with reference to the drawings.

A functional block diagram of a projector 2 according to the second embodiment is the same as that of the projector 1 according to the first embodiment and will therefore not be described. Further, the same components as those in the first embodiment have the same reference numerals.

The scaler IC 9 in the projector 2 according to the second embodiment receives data formed of an 8-bit R component, an 8-bit G component, and an 8-bit B component as an input from the front-end IC 8. The scaler 14 then sequentially loads (stores) the inputted RGB-formatted signals into the frame memory 15 on an 8-bit basis. The projector 2 does not convert the RGB-formatted signal into a YUV-formatted signal.

A description will now be made of color palettes in the projector 2. The color palettes are stored in the ROM 23.

FIGS. 6A and 6B show the color palettes in the projector 2 according to the second embodiment. FIG. 6A shows a typical color palette, and FIG. 6B shows a color palette for a standby image and OSD display.

As shown in FIG. 6A, in a typical color palette P1, white, yellow, cyan, green, magenta, red, blue, and black are each expressed by using "0 (0h)" or "255 (FFh)." However, "0" and "255" expressed in bits are "00000000b" and "11111111b". When these data are loaded from the scaler 14 into the frame memory 15 via the 8-bit data bus, a large magnitude of switching noise is produced.

To address the problem, when a standby image is displayed or OSD display is performed or other types of operation are performed, a color palette P2 shown in FIG. 6B is used. In the color palette P2, white, yellow, cyan, green, magenta, red, blue, and black are each expressed by using "0 (0h)" or "240 (F0h)." "0" and "240" expressed in bits are "00000000b" and "11110000b". Using the values described above slightly lowers the brightness grayscale level but reduces the amount of change in the signals at the time of loading these data from the scaler 14 into the frame memory 15 via the 8-bit data bus and also reduces the difference sum. The color palette P2 corresponds to a predetermined color palette.

The second embodiment described above can provide the same advantageous effects as the effects (4) and (5) provided by the first embodiment and can further provide the following advantageous effect.

(1) The scaler 14 in the projector 2 writes (loads) and reads image data configured in the RGB format to and from the frame memory 15 via the data bus on an 8-bit basis. When the projector 2 displays a standby image or image data for OSD display, the color palette P2 is used. As a result, a change in each signal in the data bus decreases, and the difference sum also decreases. The switching noise (simultaneous switching noise) and the radiation noise can therefore be reduced, whereby EMI noise can be suppressed.

The invention is not limited to the embodiments described above, and a variety of changes, improvements, and other modifications can be made to the embodiments. Variations follow.

Variation 1

In the first embodiment described above, a background image projected by the projector 1 is formed of background image data so produced that the difference sum is small and the magnitude of radiation noise is small when the brightness grayscale level is changed. A background image projected by the projector 1 may instead be formed of background image data so produced that the difference sum is small and the magnitude of radiation noise is small when the hue is changed.

Variation 2

In the first embodiment described above, image data in both the RGB format and the YUV format is 10-bit data, but the image data is not necessarily 10-bit data. For example, image data may instead be 8-bit data to eliminate the need to convert 10-bit data into 8-bit data.

Variation 3

In the first and second embodiments described above, the data bus of the bus B has an 8-bit width, but the data bus may instead have an 8-bit width multiplied by m (m is an integer greater than or equal to 1). In this case, data can still be loaded into the frame memory 15 on an 8-bit basis with the write speed improved.

Variation 4

In the second embodiment described above, the color palette P2 uses "0 (0h)" and "240 (F0h)", but the color palette P2 does not necessarily use "240 (F0h)" and may instead use "224 (E0h)" or "192 (C0h)". In this case, the brightness grayscale level slightly decreases, but a change in each signal that occurs when these data are loaded from the scaler 14 via the 8-bit data bus into the frame memory 15 decreases, and the difference sum also decreases. The switching noise and the radiation noise can therefore be reduced.

Variation 5

In the projector 1 according to the first embodiment described above, background image data that forms a standby image, is used in OSD display, or is otherwise used is stored in the ROM 23 but may instead be stored in another nonvolatile memory (not shown) provided in the image processing unit 7.

Variation 6

In the projector 1 according to the first embodiment described above, background image data so produced that the difference sum is small and the magnitude of the radiation noise is also small is stored in advance in the ROM 23, but the ROM 23 may be replaced with a rewritable nonvolatile memory that allows background image data that forms a standby image, is used in OSD display, or is otherwise used to be rewritable. In this case, the projector 1 includes a communication unit (not shown) capable of writing information on background image data received from a personal computer or any other external apparatus (not shown) to the ROM 23 under the control of the CPU 21. Background image data so produced that the magnitude of radiation noise is small can therefore be set in the projector 1 even after product development.

Variation 7

In the first and second embodiments described above, the image display apparatus is a projector that projects an image on the screen SC but is not limited to a projector. The image display apparatus according to an embodiment of the invention may instead be a liquid crystal monitor or a liquid crystal television that displays an image on a liquid crystal display panel, a monitor apparatus or a television receiver that displays an image on a PDP (plasma display panel), a self-luminous display apparatus, such as a monitor apparatus or a television receiver that displays an image on an organic EL display panel called, for example, an OLED (Organic Light-Emitting Diode) and OEL (Organic Electro-Luminescence), and a variety of other display apparatus.

Variation 8

The functional portions in the projectors 1 and 2 shown in FIG. 1 show functional configurations, and specific implementations thereof are not limited to particular ones. Further, the other specific detailed configurations can also be arbitrarily changed to the extent that the changes do not depart from the substance of the invention.

The entire disclosure of Japanese Patent Application No. 2014-015230, filed Jan. 30, 2014 is expressly incorporated by reference herein.

What is claimed is:

1. An image display apparatus comprising:

a processor;

a frame memory into which image data is loaded;

a data bus that electrically connects the processor and the frame memory to each other; and a display unit that displays an image based on the image data, wherein the processor loads background image data stored as the image data configured in a predetermined color information format into the frame memory via the data bus in a unit of a predetermined number of bits, the display unit displays a background image based on the background image data loaded into the frame memory, and when the color information for each pixel is divided into n parts (n is an integer greater than or equal to 1) to form divided data in a unit of the predetermined number of bits, the number of standing bits, which is the number of bits having a value of 1, is calculated for each of the parts of the divided data, differences in the number of standing bits between the n parts of the divided data are calculated, and a sum of the differences in the number of standing bits is calculated as a difference sum, the background image data is image data having a difference sum that falls within a lower 50% of the difference sums arranged in descending order for the color information that satisfies a condition that a brightness grayscale level is 90% or greater.

2. The image display apparatus according to claim 1, wherein the predetermined number of bits is determined by a storage bit unit of the frame memory.

3. The image display apparatus according to claim 1, wherein among a set of the background image data each of which has the difference sum having a minimum value, the display unit displays the background image using background image data having a maximum brightness.

4. The image display apparatus according to claim 1, wherein the predetermined color information format is a YUV format, and the display unit displays the background image using the background image data having the difference sum of 10 or smaller.

5. The image display apparatus according to claim 1, wherein the predetermined color information format is an RGB format, the background image data is generated based on a predetermined color palette, and the display unit displays the background image using the generated background image data.

6. The image display apparatus according to claim 1, wherein the background image is a standby image displayed when no image signal is inputted to the image display apparatus.

7. The image display apparatus according to claim 1, wherein the background image is a background image in OSD display.

8. A method for controlling an image display apparatus including a processor, a frame memory into which image data is loaded, a data bus that electrically connects the processor and the frame memory to each other, and a display unit that displays an image based on the image data, the method comprising:

allowing the processor to load background image data stored as the image data configured in a predetermined color information format into the frame memory via the data bus in a unit of a predetermined number of bits; and allowing the display unit to display a background image based on the background image data loaded into the frame memory, wherein when the color information for each pixel is divided into n parts (n is an integer greater than or equal to 1) to form divided data in a unit of the predetermined number of bits, the number of standing bits, which is the number of bits having a value of 1, is calculated for each of the parts of the divided data, differences in the number of standing bits between the n parts of the divided data are calculated, and a sum of the differences in the number of standing bits is calculated as a difference sum, the background image data is image data having a difference sum that falls within a lower 50% of the difference sums arranged in descending order for the color information that satisfies a condition that a brightness grayscale level is 90% or greater.

* * * * *